(12) United States Patent
Cook et al.

(10) Patent No.: US 10,798,396 B2
(45) Date of Patent: Oct. 6, 2020

(54) SYSTEM AND METHOD FOR TEMPORAL DIFFERENCING WITH VARIABLE COMPLEXITY

(71) Applicant: Samsung Display Co., Ltd., Yongin-si, Gyeonggi-do (KR)

(72) Inventors: Gregory W. Cook, San Jose, CA (US); Dale F. Stolitzka, Los Altos, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 249 days.

(21) Appl. No.: 15/367,123

(22) Filed: Dec. 1, 2016

(65) Prior Publication Data

US 2017/0188037 A1 Jun. 29, 2017

Related U.S. Application Data

(60) Provisional application No. 62/325,885, filed on Apr. 21, 2016, provisional application No. 62/264,757, filed on Dec. 8, 2015.

(51) Int. Cl.
*H04N 11/02* (2006.01)
*H04N 19/44* (2014.01)
(Continued)

(52) U.S. Cl.
CPC ........... *H04N 19/44* (2014.11); *H04N 19/174* (2014.11); *H04N 19/428* (2014.11);
(Continued)

(58) Field of Classification Search
CPC .... H04N 19/44; H04N 19/174; H04N 19/428; H04N 19/433; H04N 19/436; G09G 2350/00
(Continued)

(56) References Cited

U.S. PATENT DOCUMENTS 5,777,677 A 7/1998 Linzer et al.
6,970,504 B1 11/2005 Kranawetter et al.
(Continued)

FOREIGN PATENT DOCUMENTS

CN 1247003 A 3/2000
CN 101924945 A 12/2010
(Continued)

OTHER PUBLICATIONS

Gupte, Ajit D., et al., "Memory Bandwidth and Power Reduction Using Lossy Reference Frame Compression in Video Encoding," IEEE Transaction on Circuits and Systems for Video Technology, vol. 21, No. 2, Feb. 2011, pp. 225-230.
(Continued)

*Primary Examiner* — Jayanti K Patel
*Assistant Examiner* — Richard B Carter
(74) *Attorney, Agent, or Firm* — Lewis Roca Rothgerber Christie LLP

(57) ABSTRACT

A system and method for transmitting compressed video. A transmitter receives uncompressed video data from a video source, and compresses it using one or more reference frames. A receiver receives the compressed video data and decodes it, using the same reference frames, to form display data. The reference frames are stored in compressed form in both the transmitter and the receiver. Each frame of display data becomes a reference frame for the decoding of a subsequent frame.

20 Claims, 5 Drawing Sheets

(51) Int. Cl.
*H04N 19/426* (2014.01)
*H04N 19/436* (2014.01)
*H04N 19/433* (2014.01)
*H04N 19/174* (2014.01)

(52) U.S. Cl.
CPC ......... *H04N 19/433* (2014.11); *H04N 19/436* (2014.11); *G09G 2350/00* (2013.01)

(58) Field of Classification Search
USPC .................. 375/240.12, 240.26, 240.03
See application file for complete search history.

(56) References Cited

U.S. PATENT DOCUMENTS

| | | | |
|---|---|---|---|
| 7,664,184 B2 | 2/2010 | Reznic et al. | |
| 7,936,826 B2 | 5/2011 | Chen et al. | |
| 8,005,149 B2* | 8/2011 | Lerner | H04N 21/2365 375/240.26 |
| 8,130,830 B2 | 3/2012 | Xu et al. | |
| 8,429,699 B2 | 4/2013 | Rodriguez et al. | |
| 8,503,521 B2 | 8/2013 | Sung et al. | |
| 8,520,962 B2 | 8/2013 | Han et al. | |
| 8,687,702 B2 | 4/2014 | Schmit | |
| 2004/0156549 A1 | 8/2004 | Persiantsev | |
| 2005/0123044 A1 | 6/2005 | Katsavounidis et al. | |
| 2006/0146934 A1* | 7/2006 | Caglar | H04N 21/23406 375/240.12 |
| 2006/0165303 A1 | 7/2006 | Cha et al. | |
| 2008/0165859 A1 | 7/2008 | Sung et al. | |
| 2009/0003447 A1 | 1/2009 | Christoffersen et al. | |
| 2010/0027617 A1 | 2/2010 | Lee et al. | |
| 2010/0098166 A1 | 4/2010 | Budagavi et al. | |
| 2010/0232513 A1 | 9/2010 | Tseng et al. | |
| 2011/0002396 A1 | 1/2011 | Ivanov | |
| 2011/0103472 A1 | 5/2011 | Lefebvre et al. | |
| 2012/0170646 A1* | 7/2012 | Baylon | H04N 19/619 375/240.02 |
| 2013/0136177 A1* | 5/2013 | Tajime | H04N 19/46 375/240.12 |
| 2013/0170550 A1 | 7/2013 | Li et al. | |
| 2013/0243100 A1 | 9/2013 | Liu et al. | |
| 2014/0003517 A1 | 1/2014 | Agthe et al. | |
| 2014/0086328 A1 | 3/2014 | Chen et al. | |
| 2014/0092969 A1 | 4/2014 | Lee et al. | |
| 2014/0140405 A1 | 5/2014 | Seregin et al. | |
| 2014/0355665 A1* | 12/2014 | Wegener | H04N 19/127 375/240.02 |
| 2015/0296209 A1 | 10/2015 | Thirumalai et al. | |
| 2015/0373330 A1* | 12/2015 | Jeong | H04N 19/44 375/240.03 |
| 2016/0219343 A1* | 7/2016 | Lida | H04N 21/64769 |

FOREIGN PATENT DOCUMENTS

| | | |
|---|---|---|
| CN | 103313051 A | 9/2013 |
| EP | 1298937 A1 | 4/2003 |
| WO | 9827737 | 6/1998 |
| WO | 2005/088983 A2 | 9/2005 |

OTHER PUBLICATIONS

Walls et al., "VESA Display Stream Compression," VESA, 2014, pp. 1-5, XP055231850, Internet URL: http://www.vesa.org/wp-content/uploads/2014/04/VESA_DSC-ETP200.pdf.

EPO Extended Search Report dated Jun. 7, 2017, for corresponding European Patent Application No. 16202782.5 (9 pages).

U.S. Office Action dated Aug. 28, 2018, issued in U.S. Appl. No. 15/344,444 (18 pages).

Final Rejection issued in U.S. Appl. No. 15/344,444 by the USPTO, dated Oct. 4, 2019, 16 pages.

Chono, Keiichi et al., "JCT-VC AHG report: Memory compression", Joint Collaborative Team on Video Coding (JCT-VC) of ITU-T SG16 WP3 and ISO/IEC JTC1/SC29/WG11, Oct. 7-15, 2010, pp. 1-9.

Guo, Li et al., "A New Reference Frame Recompression Algorithm and Its VLSI Architecture for UHDTV Video Codec", IEEE Transactions on Multimedia, Dec. 2014, pp. 2323-2325, vol. 16, No. 8, IEEE.

* cited by examiner

SYSTEM AND METHOD FOR TEMPORAL DIFFERENCING WITH VARIABLE COMPLEXITY

CROSS-REFERENCE TO RELATED APPLICATION(S)

The present application claims priority to and the benefit of U.S. Provisional Application No. 62/264,757, filed Dec. 8, 2015, entitled "SYSTEM AND METHOD OF USING COMPRESSED REFERENCE FRAMES IN VIDEO CODECS" and U.S. Provisional Application No. 62/325,885, filed Apr. 1, 2016, entitled "ADSC TEMPORAL DIFFERENCING OPTION PRELIMINARY COMPLEXITY ANALYSIS", the entire content of both of which is incorporated herein by reference.

The present application is related to U.S. patent application Ser. No. 15/344,444, filed on Nov. 4, 2016, entitled "SYSTEM AND METHOD OF USING COMPRESSED REFERENCE FRAMES IN VIDEO CODECS", ("the '444 application"), the entire content of which is incorporated herein by reference.

FIELD

One or more aspects of embodiments according to the present invention relate to the transmission of compressed video data, and more particularly to a system and method for encoding uncompressed video data and decoding compressed video data using compressed reference frame data.

BACKGROUND

A video display may receive data at relatively high data rates from a video data source, such as a video card in a computer. The video data may be compressed at the video data source and decompressed at the display, to enable the sending of higher effective data rates through a channel having a certain capacity. The decoding of video data may involve using reference frames, e.g., previously displayed frames of video (or uncompressed and displayed frames of video). Storing the reference frames may require significant amounts of memory, which may be costly.

Thus, there is a need for a cost-effective system and method for decoding compressed video data.

SUMMARY

Aspects of embodiments of the present disclosure are directed toward a system and method for transmitting compressed video. A transmitter receives uncompressed video data from a video source, and compresses it using one or more reference frames. A receiver receives the compressed video data and decodes it, using the same reference frames, to form display data. The reference frames are stored in compressed form in both the transmitter and the receiver. Each frame of display data becomes a reference frame for the decoding of a subsequent frame.

According to an embodiment of the present invention there is provided a video receiver, including: a first decoder, configured to: receive compressed video data and uncompressed reference frame data; and generate uncompressed display data; a first encoder, configured to: receive the display data from the first decoder; and compress the display data to form compressed reference frame data; a reference frame data buffer, configured to store the compressed reference frame data; and a second decoder, configured to: retrieve compressed reference frame data from the reference frame data buffer; and decode the compressed reference frame data to form the uncompressed reference frame data, wherein the first encoder and second decoder are configured to operate at a lower compression ratio than the first decoder.

In one embodiment, the first decoder is an advanced display stream compression decoder.

In one embodiment, the first encoder is a display stream compression encoder and the second decoder is a display stream compression decoder.

In one embodiment, the first decoder is configured to operate at a compression ratio of 4:1.

In one embodiment, the first encoder is configured to operate with a compression factor of at least 2:1.

In one embodiment, the first encoder is configured to operate with a compression factor of at least 2.4:1.

In one embodiment, each reference frame consists of n slices, each slice corresponding to a rectangular portion of the reference frame, and the first encoder is configured to compress the display data one slice at a time.

In one embodiment, the reference frame data buffer includes n+1 slice buffers, n being a positive integer, each slice buffer having a size sufficient to store one compressed slice of a reference frame.

In one embodiment, the second decoder is configured to decode data from one slice buffer at a time.

In one embodiment, the second decoder is configured to generate 2 lines of uncompressed reference frame data at a time.

In one embodiment, the second decoder is configured to generate 4 lines of uncompressed reference frame data at a time.

In one embodiment, the second decoder is configured to generate 6 lines of uncompressed reference frame data at a time.

In one embodiment, the receiver is configured: to save compressed reference frame data from the first encoder into a temporary slice buffer of the n+1 slice buffers, while the second decoder decodes data from a first slice buffer of the n+1 slice buffers, and to complete the saving of compressed reference frame data into the temporary slice buffer when the second decoder completes decoding data from the first slice buffer, and to copy the compressed reference frame data from the temporary slice buffer to the first slice buffer when the second decoder completes decoding data from the first slice buffer.

In one embodiment, the slice buffer is a ring buffer; the receiver is configured: to save compressed reference frame data into a first slice buffer, of the n+1 slice buffers, identified by a first pointer, while the second decoder decodes data from a second slice buffer, of the n+1 slice buffers, identified by a second pointer, the first slice buffer and the second slice buffer being circularly adjacent in the ring buffer; to complete the saving of compressed reference frame data into the first slice buffer when the second decoder completes decoding compressed reference frame data from a second slice buffer; and to advance both the first pointer and the second pointer to identify a respective subsequent slice buffer of the n+1 slice buffers, the first pointer being advanced to point to the second slice buffer, both the first pointer and the second pointer being advanced in the same direction.

According to an embodiment of the present invention there is provided a video receiver including a first display data generator and a second display data generator, each of the first display data generator and the second display data generator including: a first decoder, configured to: receive compressed video data and uncompressed reference frame data; and generate uncompressed display data; a first encoder, configured to: receive the display data from the first decoder; and compress the display data to form compressed reference frame data; a reference frame data buffer, configured to store the compressed reference frame data; and a second decoder, configured to: retrieve compressed reference frame data from the reference frame data buffer; and decode the compressed reference frame data to form the uncompressed reference frame data, wherein the first encoder and second decoder are configured to operate at a lower compression ratio than the first decoder.

In one embodiment, the first decoder is configured to generate a first half of each line of uncompressed video data and the second decoder is configured to generate a second half of each line of uncompressed video data.

In one embodiment, the first decoder is an advanced display stream compression decoder; the first encoder is a display stream compression encoder; and the second decoder is a display stream compression decoder.

According to an embodiment of the present invention there is provided a method for generating display data, the method including: receiving, by a first decoder, compressed video data, and uncompressed reference frame data; generating, by the first decoder, uncompressed display data; receiving, by a first encoder, the display data from the first decoder; compressing, by the first encoder, the display data to form compressed reference frame data; storing, by a reference frame data buffer, the compressed reference frame data; retrieving, by a second decoder, compressed reference frame data from the reference frame data buffer; and decoding, by the second decoder, the compressed reference frame data to form the uncompressed reference frame data, wherein the first encoder and second decoder are configured to operate at a lower compression ratio than the first decoder.

In one embodiment, the first decoder is an advanced display stream compression decoder.

In one embodiment, the first encoder is a display stream compression encoder and the second decoder is a display stream compression decoder.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for temporal differencing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
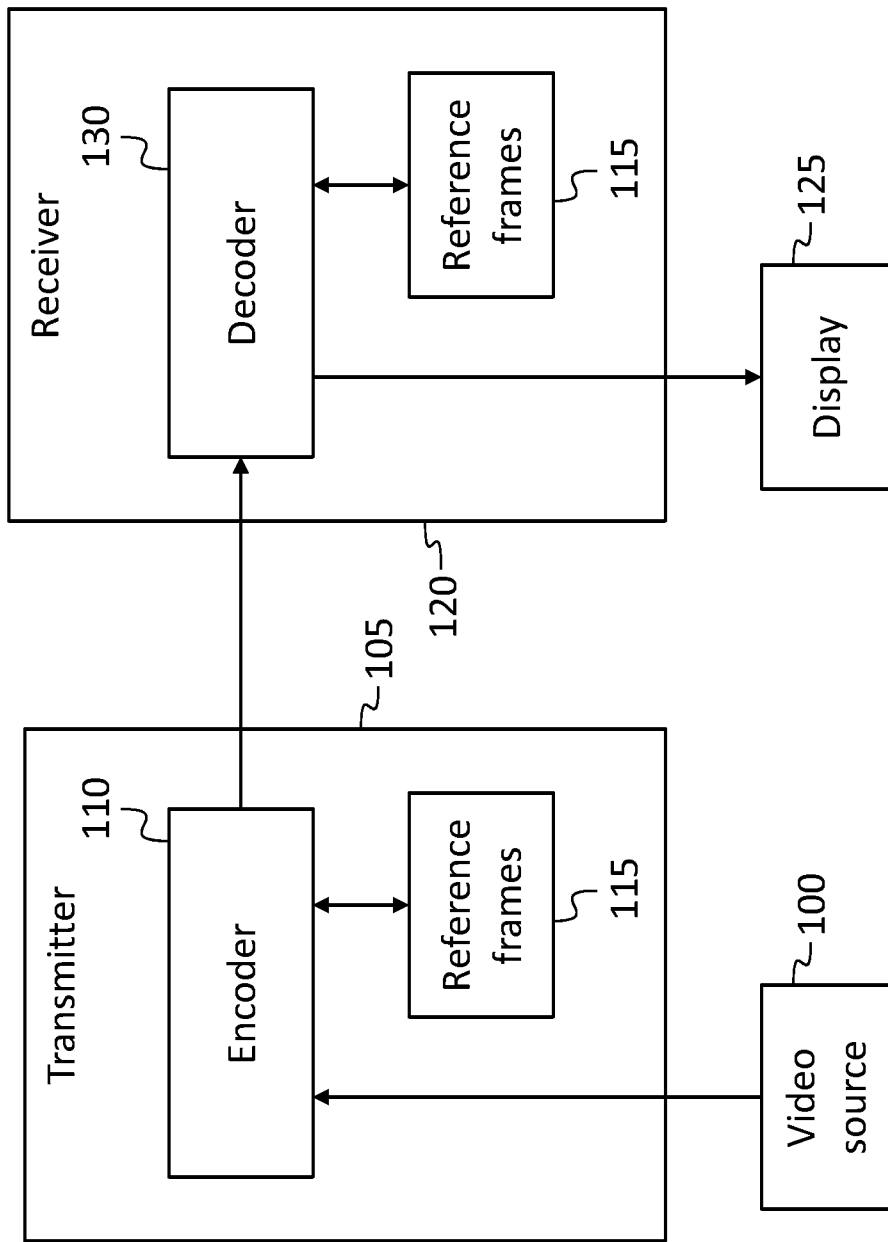
FIG. 1A is a video system, according to an embodiment of the present invention.

Referring to FIG. 1A, in some embodiments, a video data source 100 (such as a computer or video card) may generate successive frames of video data. A transmitter 105 at or in the video data source may include a main encoder 110 and a plurality of reference frames 115. The main encoder 110 may receive uncompressed video data from the video data source 100, and compress the frames of video data, using the reference frames 115, to form compressed video data. The compressed video data may be transmitted to a receiver 120 that is connected to or in a recipient of video data, such as a display 125. The receiver may include a main decoder 130 and a plurality of reference frames 115, and the main decoder 130 may decode the received compressed video data, using the reference frames 115, to reconstitute the original frames of video data, or, if the compression and decompression is not lossless, to generate new frames of video data that resemble the original frames of video data. The system for encoding and decoding the video data may be referred to as an encoder-decoder or "video codec".

The reference frames may be previously displayed frames. For example, the compressed video data may include information about differences between the original video frames, and the receiver may store one or more previously displayed frames and infer a current frame (i.e., a frame to be displayed) from the one or more previously displayed frames and the information about differences between the original video frames that it receives in the compressed video data. In the terminology used herein, a receiver is identified, for clarity, as a separate element from a display, even though in a commercial product the receiver and the display may share elements such as an enclosure, a power supply, or an integrated circuit substrate. The combination of the receiver and the display may be referred to as a "display device". The portion of the display that forms a viewable image may be referred to as the "display panel". The display may include a display panel configured to display images each consisting of a plurality of pixels arranged in rows (or "lines") and columns; each pixel may include (e.g., consist of) three subpixels (e.g., a red subpixel, a green subpixel, and a blue subpixel). A "receiver" as used herein is a circuit that receives compressed video data and generates uncompressed video data, and a "display" is an apparatus that receives uncompressed video data and generates images for viewing by a user. The term "coding" as used herein refers to generating compressed data (e.g., video data or reference frame data) from uncompressed data, and the term "decoding" as used herein refers to generating uncompressed data (e.g., video data or reference frame data) from compressed data. As used herein, "reference frame data" refers to data that represent one or more reference frames or one or more portions of one or more reference frames.

Figure 1B:
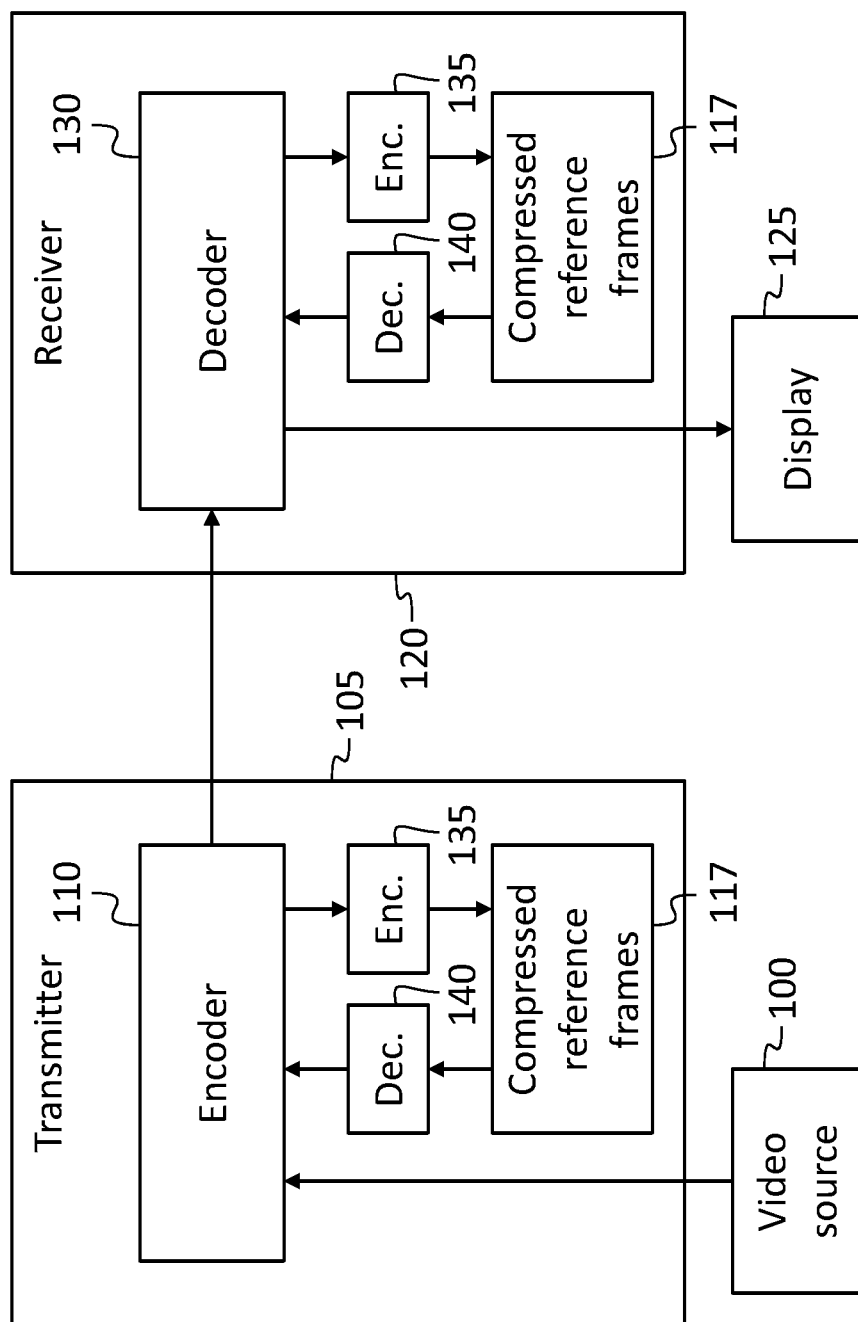
FIG. 1B is a video system, according to an embodiment of the present invention.

Storing the one or more reference frames may consume significant amounts of memory, which may be costly. Accordingly, in some embodiments, the one or more reference frames are stored in compressed form. The compression method used to store the one or more reference frames may be the same as, or different from, the compression method used by the transmitter to generate the compressed video data. For example, referring to FIG. 1B, and as discussed in the '444 application, in one embodiment, the reference frames are encoded by a reference frame encoder 135, stored as compressed reference frame data, (e.g., compressed reference frames 117) and decoded when needed by a reference frame decoder 140. The encoding and decoding may be performed in the receiver (to reduce the amount of memory used in the receiver to store the reference frame data), and the same encoding and decoding may be performed in the transmitter, so that, if the combined effect of the reference frame encoder 135 and the reference frame decoder 140 is not lossless, the encoder 110 will use the same reconstituted (i.e., encoded and decoded) reference frames as the decoder 130.

Figure 1C:
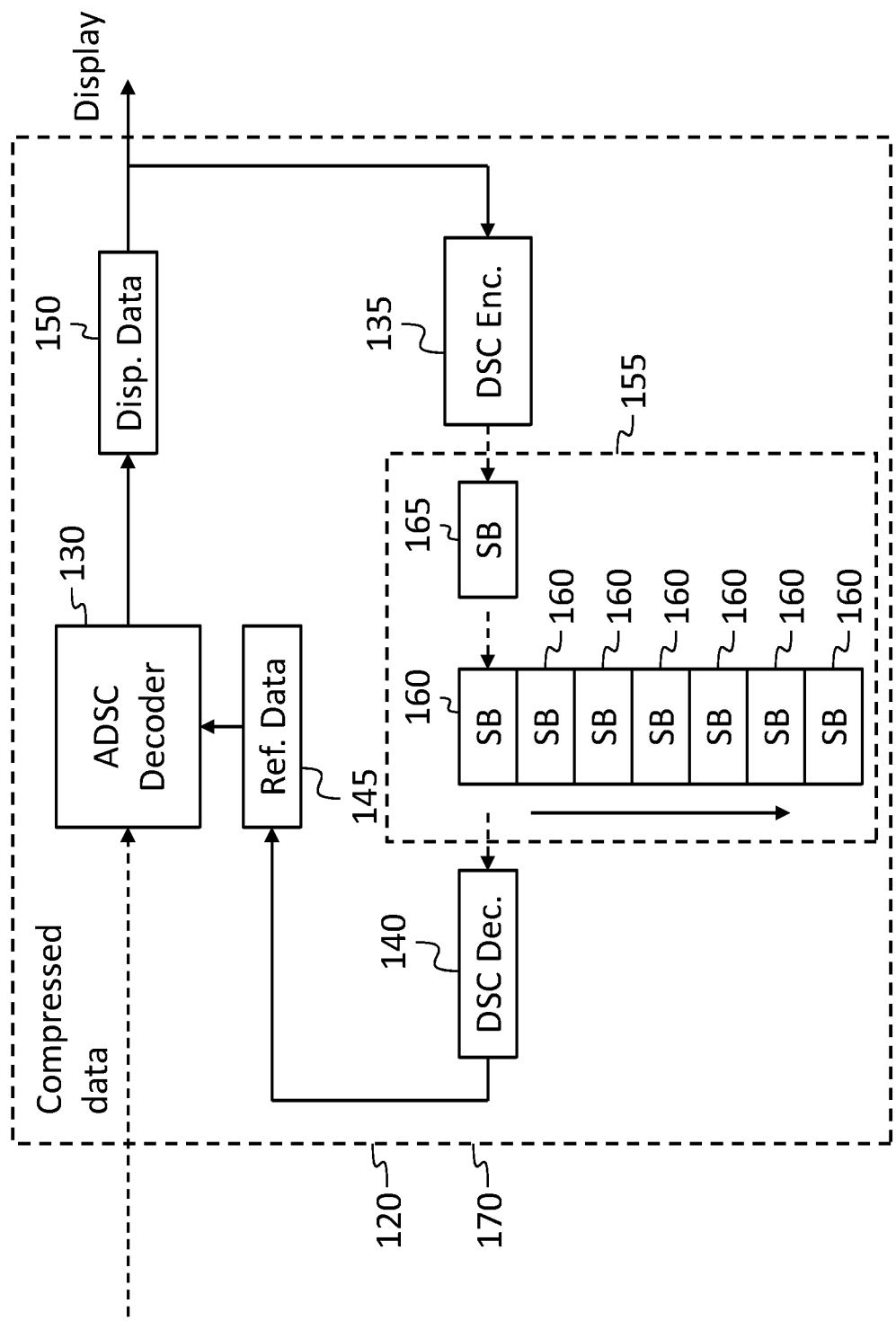
FIG. 1C is a video receiver, according to an embodiment of the present invention.

Referring to FIG. 1C, in some embodiments, the main decoder 130 may be an advanced display stream compression (ADSC) decoder, e.g., it may be a decoder, operating at a compression ratio of 4:1, complying with an ADSC standard being promulgated by the Video Electronics Standards Association. The reference frame encoder 135 may be a display stream compression (DSC) encoder, e.g., it may be a decoder complying with a DSC standard promulgated by the Video Electronics Standards Association, and the reference frame decoder 140 may be a DSC decoder. The reference frame encoder 135 may operate with a compression ratio of 3:1 (or, in some embodiments, of 2:1 or of 1:1); accordingly the reference frame decoder 140 may operate with a compression ratio (or "decompression ratio") of 3:1 (or, in some embodiments, of 2:1 or of 1:1, or with a non-integral compression ratio, e.g., 2.4:1). The compression ratio may affect reconstruction quality. ADSC and DSC encoders and decoders may operate to within $\frac{1}{16}$ bpp (bits per pixel) resolution where "bits per pixel" refers to the number of bits required to store a pixel in compressed form. In some embodiments the main decoder 130 and the reference frame decoder 140 are both DSC decoders, and the reference frame encoder 135 is a DSC encoder.

The main decoder 130 may receive compressed data from the transmitter, and uncompressed reference frame data (which may be stored temporarily in an uncompressed reference frame data buffer 145) from the reference frame decoder 140, and it may generate display data (which may be stored temporarily in a display data buffer 150). The display data may be generated, e.g., 2 lines at a time (or 4 lines at a time, or 6 lines at a time), stored temporarily in the display data buffer 150, and sent to the display, and also to the reference frame encoder 135.

The reference frame encoder 135 may encode the display data, e.g., 2 lines at a time (or 4 lines at a time, or 6 lines at a time), and store it in a reference frame data buffer 155. The compressed display data may then be used as reference frame data for decoding the next frame of video data.

The reference frame decoder 140 may retrieve compressed reference frame data (which may be compressed data from the last displayed image) from the reference frame data buffer 155, decode it to form uncompressed reference frame data, and feed the uncompressed reference frame data to the main decoder 130 (e.g., via the uncompressed reference frame data buffer 145). The reference frame decoder 140 may operate on blocks of data referred to as slices, each of which may correspond to a rectangular portion of a frame. For example, for a display that is 1920 pixels wide and 1080 pixels high, a slice may correspond to (i.e., contain data from) a rectangle with width of 1920 pixels and a height of 108 pixels, so that that each frame consists of 10 slices.

The reference frame data buffer 155 may accordingly be composed of a plurality of slice buffers 160, 165. As illustrated in FIG. 1C, the slice buffers 160 may be arranged in a ring buffer, and the reference frame data buffer 155 may include an additional slice buffer referred to as a temporary slice buffer 165. The number of slice buffers 160 in the ring buffer may be equal to the number of slices in a frame. In operation, while the reference frame decoder 140 decodes compressed reference frame data from one slice buffer, the reference frame encoder 135 may encode the display data from a slice of the current display frame and store the compressed data as compressed reference frame data (e.g., to be used as a reference frame when the next frame of video is to be decoded) in the temporary slice buffer. At the end of the current slice, (i) the reference frame decoder 140 has read all of the data from the current slice buffer 160, (ii) the final two lines of display data for the slice have been sent to the display, and (iii) the reference frame encoder 135 has encoded the final lines of display data and saved the corresponding compressed data into the temporary slice buffer 165. Then, (i) the contents of the temporary slice buffer 165 may be copied into slice buffer 160 that the reference frame decoder 140 read during the previous frame, (ii) the reference frame decoder 140 may begin decoding compressed reference frame data from the next slice buffer 160 in the ring buffer, and (iii) the reference frame encoder 135 may begin again encoding display data and saving the compressed data in the temporary slice buffer 165. Accordingly, when processing of one slice buffer is completed, the processing progresses to the next slice buffer. Consecutive slice buffers need not be adjacent in physical memory; two slice buffers may be said to be "circularly adjacent" in the ring buffer when the ring buffer is implemented such that processing progresses from one to the other (e.g., as a result of buffer pointers being advanced in the receiver).

Figure 1D:
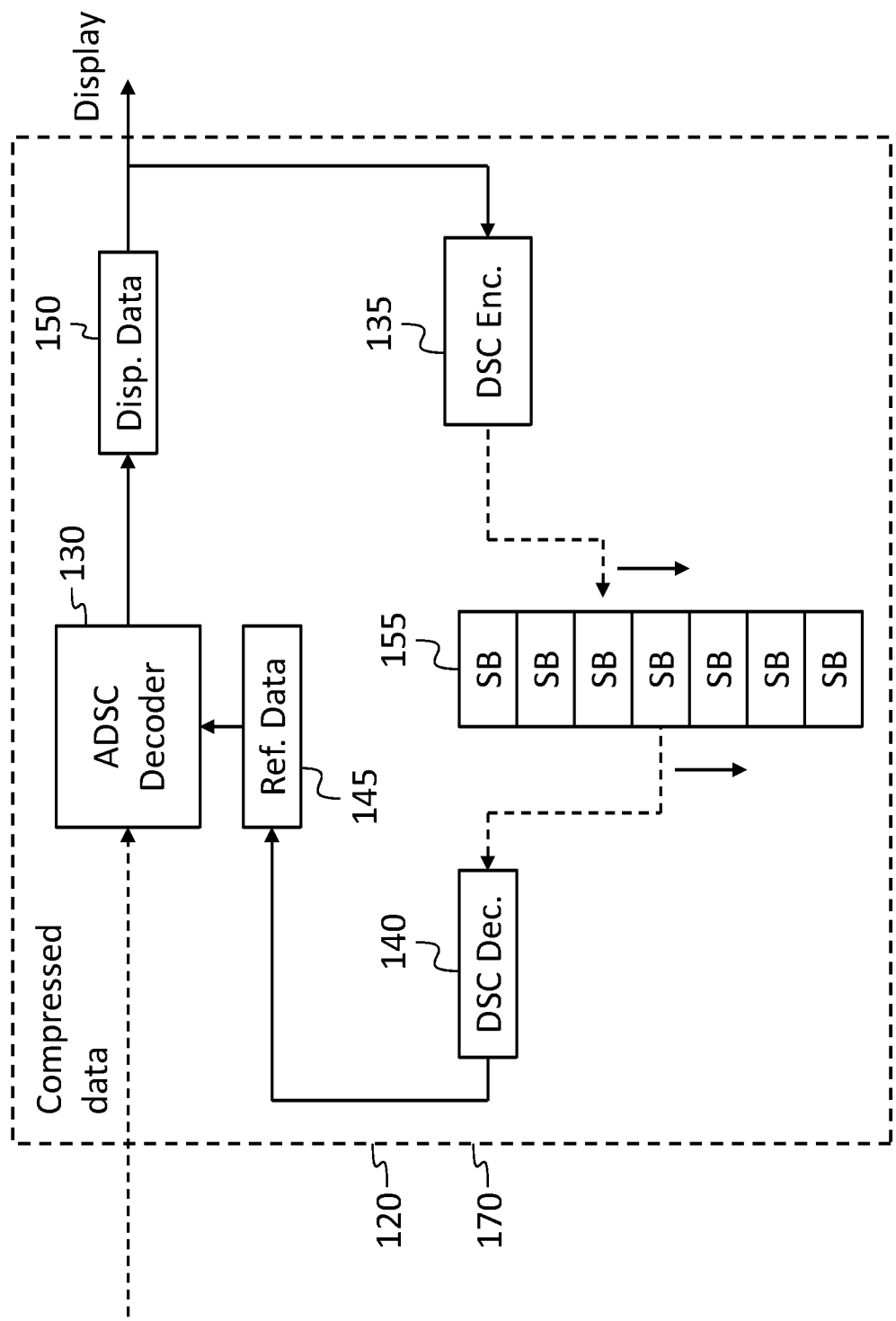
FIG. 1D is a video receiver, according to an embodiment of the present invention.

Referring to FIG. 1D, in some embodiments the reference frame data buffer 155 may contain a ring buffer including n+1 slice buffers (instead of a ring buffer with n slice buffers and a temporary slice buffer 165). In this case, as illustrated, reference frame decoder 140 may read from one slice buffer 160, and the reference frame encoder 135 may write compressed data to an adjacent slice buffer 160, which may be the slice buffer 160 that the reference frame decoder 140 read from during the previous frame. The current read buffer (i.e., the slice buffer 160 current being read from) and the current write buffer (i.e., the slice buffer 160 current being written to) may be identified by a read pointer and a write pointer respectively. At the end of the frame, each of the read pointer and the write pointer may be advanced to point to the respective next slice buffer 160, so that the reference frame encoder 135 will begin writing to the slice buffer 160 that the reference frame decoder 140 has just finished reading.

Figure 2:
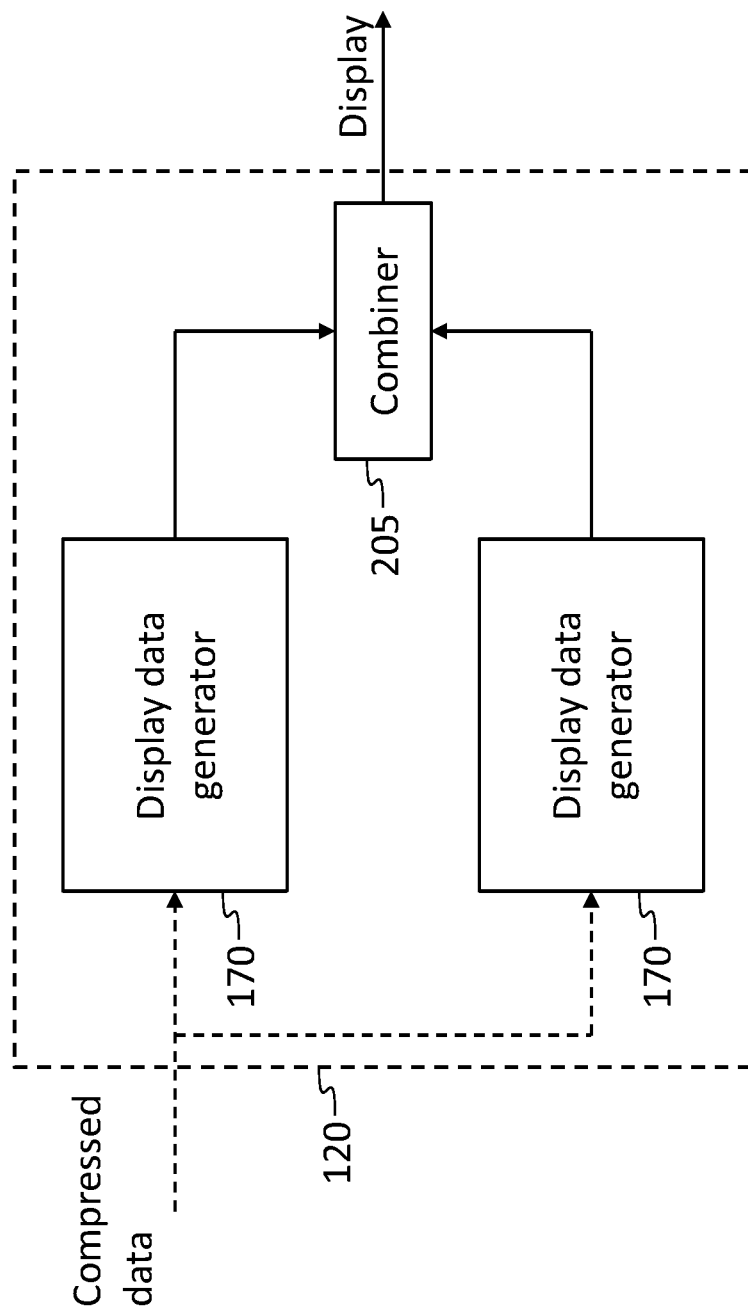
FIG. 2 is a video receiver, according to an embodiment of the present invention.

In some embodiments the receiver may include more than one of the circuits shown in FIGS. 1C and 1D, each of which may be referred to as a display data generator 170 when the receiver 120 includes more than one such circuit. Referring to FIG. 2, in some embodiments a plurality (e.g., 2, 4, or 8) display data generators 170 may operate in parallel, each furnishing a fraction of each line of display data. For example, in the embodiment of FIG. 2, a first display data generator 170 may provide data for the left half of the display, and a second display data generator 170 may provide data for the right half of the display. The first display data generator 170 may, accordingly, provide the left half of each line of display data, and the second display data generator 170 may provide the right half of each line of display data; a combiner 205 may combine the two halves of each line to form a complete line of display data for the display. The system may operate in an analogous fashion if display data are provided to the screen two lines at a time. In such an embodiment each slice may have a width that is less than the width of a frame; e.g., if there are two display data generators 170 operating in parallel as illustrated in FIG. 2, each slice may correspond to a rectangular region of the frame, having half the width of the frame.

In view of the foregoing, in system and method for transmitting compressed video, the amount of memory used to store reference frame data may be reduced. A transmitter receives uncompressed video data from a video source, and compresses it using one or more reference frames. A receiver receives the compressed video data and decodes it, using the same reference frames, to form display data. The reference frames are stored in compressed form in both the transmitter and the receiver. Each frame of display data becomes a reference frame for the decoding of a subsequent frame.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate as the display device. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for temporal differencing have been specifically described and illustrated herein, many modifications and variations will be apparent to those skilled in the art. Accordingly, it is to be understood that a system and method for temporal differencing constructed according to principles of this invention may be embodied other than as specifically described herein. The invention is also defined in the following claims, and equivalents thereof.

What is claimed is:

1. A video receiver, comprising:
   a reference frame decoder operating at a first compression ratio and providing first uncompressed reference frame data;
   a main decoder operating at a second compression ratio, wherein the main decoder is configured to:
   receive compressed video data and the first uncompressed reference frame data; and generate first uncompressed display data according to the second compression ratio using the compressed video data and the first uncompressed reference frame data;
a reference frame data buffer, configured to store a compressed reference frame data; and
a reference frame encoder operating at the first compression ratio, wherein the reference frame encoder is configured to:
receive the first uncompressed display data from the main decoder;
compress the first uncompressed display data according to the first compression ratio to form the compressed reference frame data; and
write the compressed reference frame data to the reference frame data buffer,
wherein the reference frame decoder is configured to:
retrieve the compressed reference frame data from the reference frame data buffer;
decode the compressed reference frame data according to the first compression ratio to form a second uncompressed reference frame data; and
feed the second uncompressed reference frame data to the main decoder for generating a second uncompressed display data according to the first compression ratio,
wherein the second compression ratio is a lower compression ratio than the first compression ratio.

2. The video receiver of claim 1, wherein the main decoder is an advanced display stream compression decoder.

3. The video receiver of claim 1, wherein the reference frame encoder is a display stream compression encoder and the reference frame decoder is a display stream compression decoder.

4. The video receiver of claim 1, wherein the main decoder is configured to operate at a compression ratio of 4:1.

5. The video receiver of claim 4, wherein the reference frame encoder is configured to operate with a compression factor of at least 2:1.

6. The video receiver of claim 5, wherein the reference frame encoder is configured to operate with a compression factor of at least 2.4:1.

7. The video receiver of claim 1, wherein:
the first uncompressed display data consists of n slices, each slice corresponding to a rectangular portion of a reference frame, and
the reference frame encoder is configured to compress the first uncompressed display data one slice at a time.

8. The video receiver of claim 1, wherein the reference frame data buffer comprises n+1 slice buffers, n being a positive integer, each slice buffer having a size sufficient to store one compressed slice of a reference frame.

9. The video receiver of claim 8, wherein the reference frame decoder is configured to decode data from one slice buffer at a time.

10. The video receiver of claim 8, wherein the receiver is configured:
to save the compressed reference frame data from the reference frame encoder into a temporary slice buffer of the n+1 slice buffers, while the reference frame decoder decodes data from a first slice buffer of the n+1 slice buffers, and
to complete the saving of the compressed reference frame data into the temporary slice buffer when the reference frame decoder completes decoding data from the first slice buffer, and
to copy the compressed reference frame data from the temporary slice buffer to the first slice buffer when the reference frame decoder completes decoding data from the first slice buffer.

11. The video receiver of claim 8, wherein
the slice buffer is a ring buffer;
the receiver is configured:
to save the compressed reference frame data into a first slice buffer, of the n+1 slice buffers, identified by a first pointer, while the reference frame decoder decodes data from a second slice buffer, of the n+1 slice buffers, identified by a second pointer, the first slice buffer and the second slice buffer being circularly adjacent in the ring buffer;
to complete the saving of the compressed reference frame data into the first slice buffer when the reference frame decoder completes decoding the data from the second slice buffer; and
to advance both the first pointer and the second pointer to identify a respective subsequent slice buffer of the n+1 slice buffers, the first pointer being advanced to point to the second slice buffer, both the first pointer and the second pointer being advanced in the same direction.

12. The video receiver of claim 9, wherein the reference frame decoder is configured to generate 2 lines of uncompressed reference frame data at a time.

13. The video receiver of claim 9, wherein the reference frame decoder is configured to generate 4 lines of uncompressed reference frame data at a time.

14. The video receiver of claim 9, wherein the reference frame decoder is configured to generate 6 lines of uncompressed reference frame data at a time.

15. A video receiver comprising a first display data generator and a second display data generator, each of the first display data generator and the second display data generator comprising:
a reference frame decoder operating at a first compression ratio and providing first uncompressed reference frame data;
a main decoder operating at a second compression ratio, wherein the main decoder is configured to:
receive compressed video data and the first uncompressed reference frame data; and
generate first uncompressed display data according to the second compression ratio using the compressed video data and the first uncompressed reference frame data;
a reference frame data buffer, configured to store a compressed reference frame data; and
a reference frame encoder operating at the first compression ratio, wherein the reference frame encoder is configured to:
receive the first uncompressed display data from the main decoder;
compress the first uncompressed display data according to the first compression ratio to form compressed reference frame data; and
write the compressed reference frame data to the reference frame data buffer;
wherein the reference frame decoder is configured to:
retrieve the compressed reference frame data from the reference frame data buffer;
decode the compressed reference frame data according to the first compression ratio to form a second uncompressed reference frame data; and feed the second uncompressed reference frame data to the main decoder for generating a second uncompressed display data according to the first compression ratio, wherein the second compression ratio is a lower compression ratio than the first compression ratio.

16. The video receiver of claim 15, wherein the main decoder is configured to generate a first half of each line of uncompressed video data and the reference frame decoder is configured to generate a second half of each line of uncompressed video data.

17. The video receiver of claim 15, wherein:
the main decoder is an advanced display stream compression decoder;
the reference frame encoder is a display stream compression encoder; and
the reference frame decoder is a display stream compression decoder.

18. A method for generating display data, the method comprising:
providing, by a reference frame decoder operating at a first compression ratio;
receiving, by a main decoder operating at a second compression ratio, compressed video data and the first uncompressed reference frame data;
generating, by the main decoder, first uncompressed display data according to the second compression ratio using the compressed video data and the first uncompressed reference frame data;
receiving, by a reference frame encoder, the first uncompressed display data generated by the main decoder;
compressing, by the reference frame encoder operating at the first compression ratio, the first uncompressed display data according to the first compression ratio to form compressed reference frame data;
storing, using a reference frame data buffer, the compressed reference frame data;
retrieving, by the reference frame decoder, the compressed reference frame data from the reference frame data buffer;
decoding, by the reference frame decoder operating at the first compression ratio, the compressed reference frame data according to the first compression ratio to form a second uncompressed reference frame data; and
feeding, by the reference frame decoder, the second uncompressed reference frame data to the main decoder for generating a second uncompressed display data according to the first compression ratio,
wherein the second compression ratio is a lower compression ratio than the first compression ratio.

19. The method of claim 18, wherein the main decoder is an advanced display stream compression decoder.

20. The method of claim 19, wherein the reference frame encoder is a display stream compression encoder and the reference frame decoder is a display stream compression decoder.

* * * * *